(12) United States Patent
Thaker (10) Patent No.: US 11,328,324 B1
(45) Date of Patent: May 10, 2022

(54) SYSTEMS AND METHODS FOR PROVIDING PROMOTIONS BASED ON SEARCH QUERIES

(71) Applicant: Groupon, Inc., Chicago, IL (US)

(72) Inventor: Sahil Prakash Thaker, San Jose, CA (US)

(73) Assignee: Groupon, Inc., Chicago, IL (US)

( * ) Notice: Subject to any disclaimer, the term of this patent is extended or adjusted under 35 U.S.C. 154(b) by 985 days.

(21) Appl. No.: 14/473,918

(22) Filed: Aug. 29, 2014

Related U.S. Application Data (60) Provisional application No. 61/872,550, filed on Aug. 30, 2013.

(51) Int. Cl.
*G06Q 30/02* (2012.01)
(52) U.S. Cl.
CPC .................. *G06Q 30/0256* (2013.01)
(58) Field of Classification Search
CPC .................................................. G06Q 30/0256
See application file for complete search history.

(56) References Cited

U.S. PATENT DOCUMENTS

| | | | | |
|---|---|---|---|---|
| 8,452,768 B2* | 5/2013 | Shanbhag | ............... | G06Q 30/02 707/736 |
| 9,922,344 B1* | 3/2018 | Christophe | ........ | G06Q 30/0256 |
| 2010/0324993 A1* | 12/2010 | Kacholia | ................ | G06Q 30/00 705/14.54 |
| 2011/0078049 A1* | 3/2011 | Rehman | ............. | G06Q 30/0641 705/27.1 |
| 2011/0191314 A1* | 8/2011 | Howes | .................. | G06F 16/951 707/706 |
| 2012/0047025 A1* | 2/2012 | Strohman | ........... | G06F 16/9535 705/14.71 |

\* cited by examiner

*Primary Examiner* — Hajime Rojas
*Assistant Examiner* — Alfred H Tsui
(74) *Attorney, Agent, or Firm* — Alston & Bird LLP (57) ABSTRACT

Systems, apparatus, and methods for providing promotions to consumers based on search queries are discussed herein. Some embodiments may include a system including circuitry configured to receive a search query from a consumer device. The circuitry may be further configured to determine a related promotion to the search query based on having received the search query from consumers in connection with promotion purchase data indicating purchase of the related promotion, such as may be indicated by historical data. Furthermore, the circuitry may provide an impression of the related promotion to the consumer device based on the search query. Consumer interactions with the system may be tracked as historical data and leveraged to provide one or more related promotions that are relevant and/or related to the search query.

16 Claims, 6 Drawing Sheets

SYSTEMS AND METHODS FOR PROVIDING PROMOTIONS BASED ON SEARCH QUERIES

CROSS REFERENCE TO RELATED APPLICATIONS

This application claims the benefit of U.S. Provisional Application No. 61/872,550, titled "Systems and Methods for Providing Promotions Based on Search Queries," filed Aug. 30, 2013, which is incorporated by reference herein in its entirety.

FIELD

Embodiments of the invention relate, generally, to techniques for providing promotions to consumers based on search queries.

BACKGROUND

Via electronic networks (e.g., the Internet), promotional systems provide promotions associated with merchants to consumer devices. Oftentimes, a consumer may be interested in promotions directed to a particular type of product, service, and/or experience. In this regard, areas for improving current systems have been identified.

BRIEF SUMMARY

Through applied effort, ingenuity, and innovation, solutions to improve such systems have been realized and are described herein. Some embodiments may provide for a system configured to provide promotions to consumers based on search queries. For example, the system may be configured to provide an impression of a promotion to a consumer device based on a search query received from the consumer device. In some embodiments, the promotion may be a related promotion with respect to the search query. For example, a consumer searching for flowers may be presented with a related promotion for chocolates in addition or alternative to matching promotions for the flowers search query (e.g., promotions for flowers).

Some embodiments may provide for a system configured to provide promotions to consumers. The system may include one or more servers. The one or more servers may include: communications circuitry configured to connect with consumer devices via a network; and promotion search circuitry configured to: generate historical data indicating associations between search queries and promotion records of a promotion database, wherein a search query is associated with a promotion record when the search query is received in connection with promotion purchase data indicating purchase of the promotion record from the consumer devices, the search queries and the promotion purchase data are received from the consumer devices via the network; receive, via the network, a search query from a first consumer device; determine, based the historical data, a promotion purchase count indicating a number of purchases of a promotion record that are associated with the search query; compare the promotion purchase count with one or more other promotion purchase counts indicating purchases of one or more other promotion records that are associated with the search query, wherein the one or more other promotion purchase counts are determined based on the historical data; determine the promotion record as a related promotion record to the search query based on the comparison of the promotion purchase count and the one or more other promotion purchase counts; generate an impression comprising an electronic user interface, the impression indicating the related promotion record; and provide the impression of the related promotion record to the first consumer device via the network in response to receiving the search query from the first consumer device.

In some embodiments, the promotion search circuitry configured to determine the promotion record as the related promotion record to the search query may include the promotion search circuitry being configured to: determine a promotion purchase count threshold; determine whether the promotion purchase count exceeds the promotion purchase count threshold; and in response to determining that the promotion purchase count exceeds the promotion purchase count threshold, determine the promotion record as the related promotion record to the search query.

In some embodiments, the promotion search circuitry configured to generate the historical data indicating the associations between search queries and promotion records may include the promotion search circuitry configured to: establish a communication session with a second consumer device; receive the search query from the second consumer device; receive promotion purchase data from the second consumer device indicating a purchase of the promotion record; determine whether the promotion purchase data was received in connection with the search query by determining whether the promotion purchase data and the search query were received within the communication session; and in response to determining that the promotion purchase data and the search query were received within the communication session, associate the promotion record with the search query.

In some embodiments, the promotion search circuitry configured to generate the historical data may include the promotion search circuitry configured to: receive the search query from a second consumer device; receive promotion purchase data from the second consumer device indicating a purchase of the promotion; and determine whether the promotion purchase data was received in connection with the search query; and in response to determining that the promotion purchase data was received in connection with the search query, increment a promotion purchase count for the related promotion record indicating a number of times promotion purchase data for the related promotion was received in connection with the search query from consumers.

In some embodiments, the promotion search circuitry may be further configured to: establish a communication session with the second consumer device; and determine whether the promotion purchase data was received in connection with the search query by determining whether the promotion purchase data and the search query were received within the communication session.

In some embodiments, the promotion search circuitry may be configured to determine whether the promotion purchase data was received in connection with the search query by determining whether the promotion purchase data and the search query was received within a predetermined time.

In some embodiments, the promotion search circuitry may be further configured to: access promotion data from a computer readable media indicating that the search query is a matching search query for a second promotion; determine the second promotion as a matching promotion to the matching search query based on the promotion data; and provide an impression of the matching promotion to the first consumer device based on the matching search query.

In some embodiments, the promotion search circuitry may be further configured to: determine whether the related promotion was purchased by a first consumer account associated with the first consumer device after providing the impression of the related promotion to the first consumer device; and in response to determining that the related promotion was purchased by the first consumer account, increment a promotion purchase count for the related promotion indicating a number of times promotion purchase data for the promotion was received in connection with the search query from consumers.

Some embodiments may provide for a machine-implemented method of providing promotions to consumers. The method may include: generating, by a processor, historical data indicating associations between search queries and promotion records of a promotion database, wherein a search query is associated with a promotion record when the search query is received in connection with promotion purchase data indicating purchase of the promotion record from the consumer devices, the search queries and the promotion purchase data are received from the consumer devices via a network; receiving, by the processor, a search query from a first consumer device via the network; determine, by the processor and based the historical data, a promotion purchase count indicating a number of purchases of a promotion record that are associated with on the search query; comparing, by the processor, the promotion purchase count with one or more other promotion purchase counts indicating purchases of one or more other promotion records that are associated with the search query, wherein the one or more other promotion purchase counts are determined based on the historical data; determining, by the processor, the promotion record as a related promotion record to the search query based on the comparison of the promotion purchase count and the one or more other promotion purchase counts; generating, by the processor, an impression comprising an electronic user interface, the impression indicating the related promotion record; and provide, by the processor, the impression of the related promotion record to the first consumer device via the network in response to receiving the search query from the first consumer device.

In some embodiments, determining the promotion record as the related promotion record to the search query may include: determining a promotion purchase count threshold; determining whether the promotion purchase count exceeds the promotion purchase count threshold; and in response to determining that the promotion purchase count exceeds the promotion purchase count threshold, determining the promotion record as the related promotion record to the search query.

In some embodiments, generating the historical data indicating the associations between search queries and promotion records may include: establishing a communication session with a second consumer device; receiving the search query from the second consumer device; receiving promotion purchase data from the second consumer device indicating a purchase of the promotion record; determining whether the promotion purchase data was received in connection with the search query by determining whether the promotion purchase data and the search query were received within the communication session; and in response to determining that the promotion purchase data and the search query were received within the communication session, associating the promotion record with the search query.

In some embodiments, generating the historical data indicating the receiving of the search query from consumers in connection with the promotion purchase data may include: receiving the search query from a second consumer device; receiving promotion purchase data from the second consumer device indicating a purchase of the promotion; and determining whether the promotion purchase data was received in connection with the search query; and in response to determining that the promotion purchase data was received in connection with the search query, incrementing a promotion purchase count for the related promotion indicating a number of times promotion purchase data for the related promotion record was received in connection with the search query from consumers.

In some embodiments, the method may further include, by the processor: establishing a communication session with the second consumer device; and determining whether the promotion purchase data was received in connection with the search query by determining whether the promotion purchase data and the search query were received within the communication session.

In some embodiments, determining whether the promotion purchase data was received in connection with the search query may include determining whether the promotion purchase data and the search query was received within a predetermined time.

In some embodiments, the method may further include, by the processor: accessing promotion data from a computer readable media indicating that the search query is a matching search query for a second promotion; determining the second promotion as a matching promotion to the matching search query based on the promotion data; and providing an impression of the matching promotion to the first consumer device based on the matching search query.

In some embodiments, the method may further include, by the processor: determining whether the related promotion was purchased by a first consumer account associated with the first consumer device after providing the impression of the related promotion to the first consumer device; and in response to determining that the related promotion was purchased by the first consumer account, incrementing a promotion purchase count for the related promotion indicating a number of times promotion purchase data for the promotion was received in connection with the search query from consumers.

Some embodiments may provide for a networked apparatus configured to provide promotions to consumers. The apparatus may include processing circuitry configured to: receive, via a network, a search query from a first consumer device; determine, based the historical data, a promotion purchase count indicating a number of purchases of a promotion record that are associated with the search query; determine a promotion purchase count threshold; determine whether the promotion purchase count exceeds the promotion purchase count threshold; determine the promotion record as a related promotion record to the search query based on determining that the promotion purchase count exceeds the promotion purchase count threshold; generate an impression comprising an electronic user interface, the impression indicating the related promotion record; and provide the impression of the related promotion record to the first consumer device via the network in response to receiving the search query from the first consumer device.

In some embodiments, the processing circuitry is further configured to generate historical data indicating the associations between search queries and promotion records based on the processing circuitry being configured to: establish a communication session with a second consumer device; receive the search query from the second consumer device; receive promotion purchase data from the second consumer device indicating a purchase of the promotion record; determine whether the promotion purchase data was received in connection with the search query by determining whether the promotion purchase data and the search query were received within the communication session; and in response to determining that the promotion purchase data and the search query were received within the communication session, associate the promotion record with the search query.

In some embodiments, the processing circuitry configured to generate the historical data may include the processing circuitry being configured to: receive the search query from a second consumer device; receive promotion purchase data from the second consumer device indicating a purchase of the promotion; and determine whether the promotion purchase data was received in connection with the search query; and in response to determining that the promotion purchase data was received in connection with the search query, increment a promotion purchase count for the related promotion indicating a number of times promotion purchase data for the related promotion was received in connection with the search query from consumers.

In some embodiments, the processing circuitry configured to determine whether the promotion purchase data was received in connection with the search query may include the processing circuitry being configured to determine whether the promotion purchase data and the search query was received within a predetermined time Some embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Having thus described some embodiments in general terms, reference will now be made to the accompanying drawings, which are not necessarily drawn to scale, and wherein:

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a device is described herein to receive data from another device, it will be appreciated that the data may be received directly from the another device or may be received indirectly via one or more intermediary devices, such as, for example, one or more servers, relays, routers, network access points, base stations, and/or the like, sometimes referred to herein as a "network." Similarly, where a device is described herein to send data to another device, it will be appreciated that the data may be sent directly to the another device or may be sent indirectly via one or more intermediary devices, such as, for example, one or more servers, relays, routers, network access points, base stations, and/or the like.

As used herein, the term "method" refers to one or more steps that may be performed by a device, apparatus, system, circuitry, one or more processors, among other things. Where an example method is shown as including more than one step, it will be appreciated that the steps may be performed in different orders than as shown in the example and that not all steps are necessarily required. Furthermore, the methods are described herein as being performed by example structures for clarity and are not limited to those structures (e.g., a particular server, device, apparatus, etc.) in some embodiments.

BRIEF OVERVIEW

Methods, systems, apparatus and computer program products described herein are operable for providing promotions to consumers based on search queries. A "promotion," as used herein, may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion.

In some embodiments, a system may be configured to generate historical data indicating purchases of promotions by consumers and search queries provided by the consumers. For example, the system may be configured to provide promotions and/or impressions of promotions to consumer devices based on search queries received by the consumer devices. A promotion purchase that is made closely in time and/or otherwise in connection with providing a search query may indicate a relationship and/or relevance between the promotion and the search query. The system may be configured to track and update the historical data based on consumer device interactions (e.g., promotion purchases and provided search queries) with the system.

In some embodiments, the system may be configured to use the historical data to provide an impression of a related promotion to a consumer device in response to receiving the search query from the consumer device. For example, the historical data may indicate a promotion purchase count for the related promotion indicating a number of purchases of the related promotion by consumers that are associated with the search query. Here, the promotion purchase count may indicate the number of "votes" for the promotion being related to the search query. By tracking consumer interactions, the promotion purchase count may be incremented, such as in response to the promotion purchase being made closely in time or otherwise in connection with providing the search query for a consumer. The promotion purchase count may be compared with a threshold value and/or other promotion purchase counts of other promotions. Furthermore, one or more of the highest ranking and/or qualifying promotions (and/or one or more impressions of the one or more of the highest ranking and/or qualifying promotions) may be provided to the consumer device, such as in response to receiving the search query from the consumer device. In that sense, some embodiments may provide for a technique of providing promotions based on "crowdsourcing" historical data by relating promotions to search queries.

An "impression," as used herein, may include a communication, a display, or other perceived indication, such as a flyer, print media, e-mail, text message, application alert, mobile applications, other type of electronic interface or distribution channel and/or the like, of one or more promotions. In some embodiments, the system may be configured to provide an impression of a related promotion including an interface and/or a reference to an interface for purchasing and/or accepting the related promotion.

Exemplary System Architecture

Figure 1:
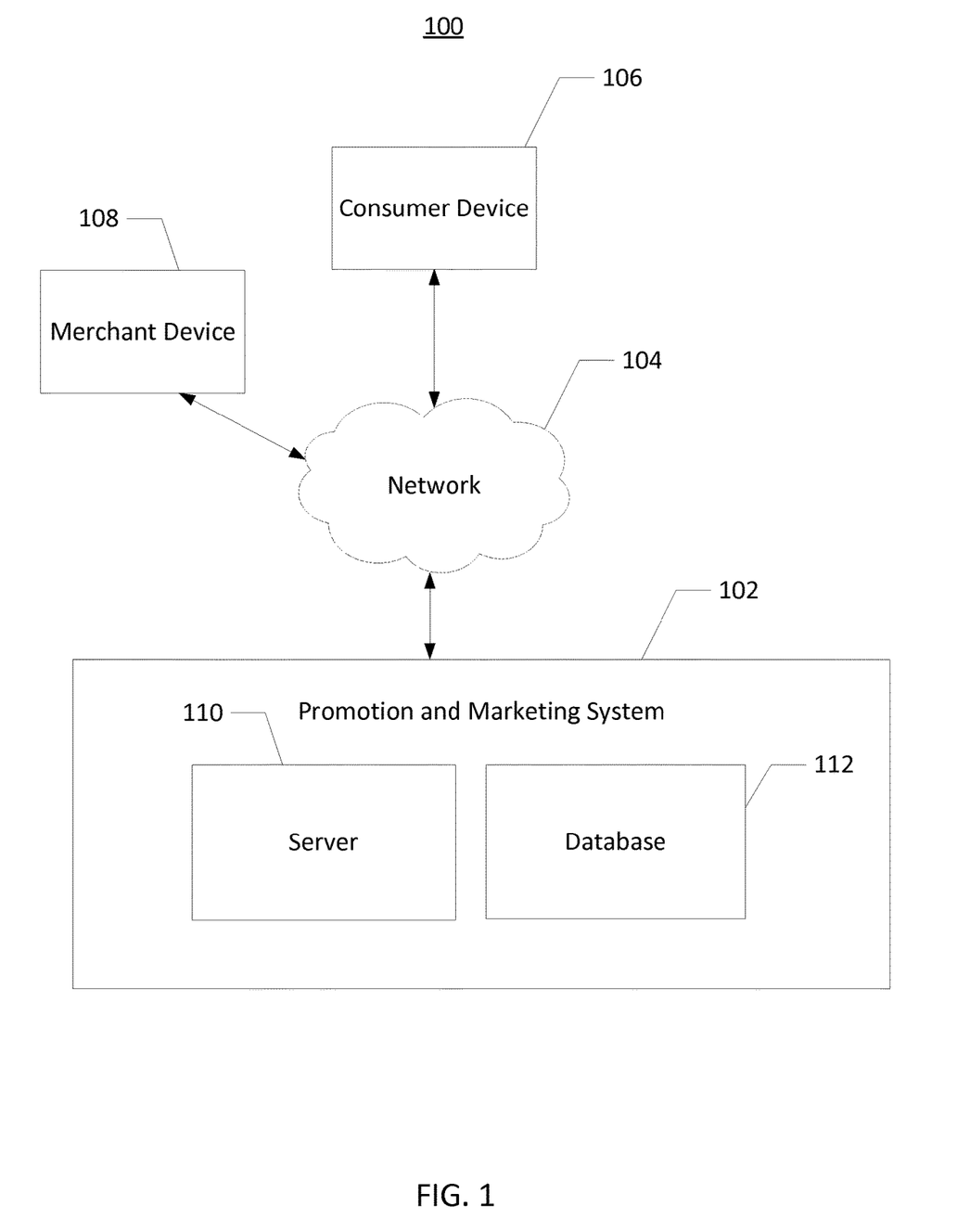
FIG. 1 shows an example system in accordance with some embodiments.

FIG. 1 shows an example system 100 in accordance with some embodiments. System 100 may include promotion and marketing system 102, which is sometimes referred to herein as "system 102", network 104, consumer device 106, and merchant device 108. System 102 may be communicably connected with consumer device 106 and merchant device 108 via network 104. System 102 may include server 110 and database 112.

Server 110 may include circuitry, networked processors, or the like configured to perform some or all of the server-based processes described herein and may be any suitable network server and/or other type of processing device. In some embodiments, system 102 may function as a "cloud" with respect to the consumer device 106 and/or merchant device 108. In that sense, server 110 may include several servers performing interconnected and/or distributed functions. To avoid unnecessarily overcomplicating the disclosure, server 110 is shown and described herein as a single server.

Database 112 may be any suitable network storage device configured to store some or all of the information described herein. For example, database 112 may be configured to store consumer information, promotion information, and/or historical data indicating purchases of promotions by consumers and search queries provided by the consumers. As such, database 112 may include, for example, one or more database systems, backend data servers, network databases, cloud storage devices, etc. To avoid unnecessarily overcomplicating the disclosure, database 112 is shown and described herein as a single database.

Network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (such as, e.g., network routers, switches, hubs, etc.). For example, network 104 may include a cellular telephone, mobile broadband, long term evolution (LTE), GSM/EDGE, UMTS/HSPA, IEEE 802.11, IEEE 802.16, IEEE 802.20, WiFi, dial-up, and/or WiMax network. Furthermore, network 104 may include a public network, such as the Internet, a private network, such as an intranet, or combinations thereof, and may utilize a variety of networking protocols now available or later developed including, but not limited to TCP/IP based networking protocols.

Consumer device 106 may be associated with a consumer and/or consumer account, such as a consumer with a consumer account provided by system 102. Although a single consumer device 106 is shown, system 100 may include any number of consumer devices that may be associated with various other consumers and/or consumer accounts. Consumer device 106 may be a mobile device and/or a stationary device. For example, consumer device 106 may be a mobile device such as a cellular telephone (including smartphones and/or other types of mobile telephones), laptop, tablet, electronic reader, e-book device, media device, and/or the like. Additionally and/or alternatively, consumer device 106 may be a stationary device such as a desktop computer, work station, point-of-sale device, or the like.

Merchant device 108 may be associated with a merchant and/or provider of promotions. Although a single merchant device 108 is shown, system 100 may include any number of merchant devices that may be associated with various other merchants. In some embodiments, merchant device 108 may be configured to provide point-of-sale (POS) functionality for the merchant, such as at the merchant's shop. Furthermore, merchant device 108 may be a stationary and/or mobile device. In some embodiments, system 102 may be configured to receive promotion data indicating a promotion for goods and/or services and/or one or more parameters of the promotion (e.g., target audience, timing, purchase value, promotional value, residual value, etc.). System 102 may then generate and/or provide one or more impressions for the promotion to consumer device 102.

Figure 2:
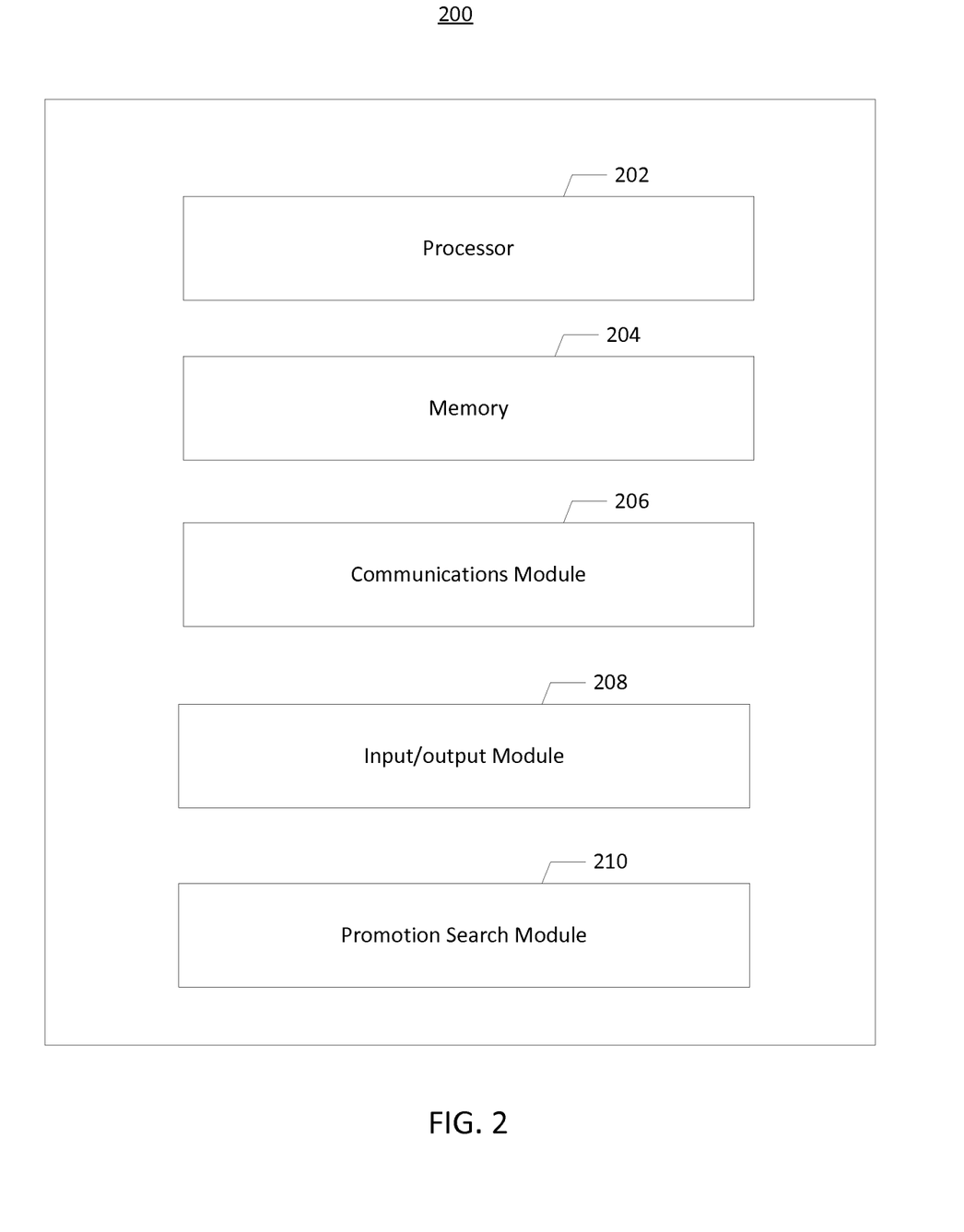
FIG. 2 shows example circuitry in accordance with some embodiments.

FIG. 2 shows a schematic block diagram of example circuitry 200, some or all of which may be included in system 102, server 110, database 112, user device 106, and/or merchant device 108. In accordance with some example embodiments, circuitry 200 may include various means, such as one or more processors 202, memories 204, communications modules 206, and/or input/output modules 208.

In some embodiments, such as when circuitry 200 is included in system 102, promotion search module 210 may also or instead be included. As referred to herein, "module" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 204) that is executable by a suitably configured processing device (e.g., processor 202), or some combination thereof.

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, processor 202 may comprise a plurality of processing means. The plurality of processing means may be embodied on a single computing device or may be distributed across a plurality of computing devices collectively configured to function as circuitry 200. The plurality of processing means may be in operative communication with each other and may be collectively configured to perform one or more functionalities of circuitry 200 as described herein. In an example embodiment, processor 202 may be configured to execute instructions stored in memory 204 or otherwise accessible to processor 202. These instructions, when executed by processor 202, may cause circuitry 200 to perform one or more of the functionalities described herein.

Whether configured by hardware, firmware/software methods, or by a combination thereof, processor 202 may comprise an entity capable of performing operations according to embodiments of the present invention while configured accordingly. Thus, for example, when processor 202 is embodied as an ASIC, FPGA or the like, processor 202 may comprise specifically configured hardware for conducting one or more operations described herein. As another example, when processor 202 may be embodied as an executor of instructions, such as may be stored in memory 204, the instructions may specifically configure processor 202 to perform one or more algorithms, methods or operations described herein. For example, processor 202 may be configured to execute operating system applications, firmware applications, media playback applications, media editing applications, among other things.

Memory 204 may comprise, for example, volatile memory, non-volatile memory, or some combination thereof. Although illustrated in FIG. 2 as a single memory, memory 204 may comprise a plurality of memory components. The plurality of memory components may be embodied on a single computing component or distributed across a plurality of computing components. In various embodiments, memory 204 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 204 may be configured to store information, data, applications, instructions, or the like for enabling circuitry 200 to carry out various functions in accordance with example embodiments discussed herein. For example, in at least some embodiments, memory 204 may be configured to buffer input data for processing by processor 202. Additionally or alternatively, in at least some embodiments, memory 204 may be configured to store program instructions for execution by processor 202 and/or data for processing by processor 202. Memory 204 may store information in the form of static and/or dynamic information. This stored information may be stored and/or used by circuitry 200 during the course of performing its functionalities.

Communications module 206 may be embodied as any component or means embodied in circuitry, hardware, a computer program product comprising computer readable program instructions stored on a computer readable medium (e.g., memory 204) and executed by a processing device (e.g., processor 202), or a combination thereof that is configured to receive and/or transmit data from/to another device, such as, for example, a second circuitry 200 and/or the like. In some embodiments, communications module 206 (like other components discussed herein) can be at least partially embodied as or otherwise controlled by processor 202. In this regard, communications module 206 may be in communication with processor 202, such as via a bus. Communications module 206 may include, for example, an antenna, a transmitter, a receiver, a transceiver, network interface card and/or supporting hardware and/or firmware/software for enabling communications. Communications module 206 may be configured to receive and/or transmit any data that may be stored by memory 204 using any protocol that may be used for communications. Communications module 206 may additionally and/or alternatively be in communication with the memory 204, input/output module 208 and/or any other component of circuitry 200, such as via a bus. Communications module 206 may be configured to use one or more communications protocols such as, for example, short messaging service (SMS), Wi-Fi (e.g., a 802.11 protocol, Bluetooth, etc.), radio frequency systems (e.g., 900 MHz, 1.4 GHz, and 5.6 GHz communication systems), infrared, GSM, GSM plus EDGE, CDMA, quad-band, and other cellular protocols, VOIP, or any other suitable protocol.

Input/output module 208 may be in communication with processor 202 to receive an indication of an input and/or to provide an audible, visual, mechanical, or other output. In that sense, input/output module 208 may include means for performing analog-to-digital and/or digital-to-analog data conversions. Input/output module 208 may include support, for example, for a display, touch screen, keyboard, button, click wheel, mouse, joystick, an image capturing device, microphone, speaker, biometric scanner, and/or other input/output mechanisms. In embodiments where circuitry 200 may be implemented as a server or database, aspects of input/output module 208 may be reduced as compared to embodiments where circuitry 200 may be implemented as an end-user machine or other type of device designed for complex user interactions. In some embodiments (like other components discussed herein), input/output module 208 may even be eliminated from circuitry 200. Alternatively, such as in embodiments wherein circuitry 200 is embodied as a server or database, at least some aspects of input/output module 208 may be embodied on an apparatus used by a user that is in communication with circuitry 200. Input/output module 208 may be in communication with memory 204, communications module 206, and/or any other component(s), such as via a bus. Although more than one input/output module and/or other component can be included in circuitry 200, only one is shown in FIG. 2 to avoid overcomplicating the disclosure (e.g., like the other components discussed herein).

In some embodiments, promotion search module 210 may also or instead be included and configured to perform the functionality discussed herein related to providing promotions to consumers based on search queries. In some embodiments, some or all of the functionality of promotion search module 210 may be performed by processor 202. In this regard, the example processes and algorithms discussed herein can be performed by at least one processor 202 and/or promotion search module 210. For example, non-transitory computer readable storage media can be configured to store firmware, one or more application programs, and/or other software, which include instructions and other computer-readable program code portions that can be executed to control processors of the components of system 200 to implement various operations, including the examples shown herein. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components and circuitry. Below is a discussion of an example process flowcharts describing functionality that may be implemented by one or more components discussed above. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 202, to produce a machine, such that the computer program product includes the instructions which execute on the computer or other programmable data processing apparatus to create a means for implementing the functions specified in the flowchart block or block diagrams.

These computer program instructions may also be stored in a computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

Providing Related Promotions

Figure 3:
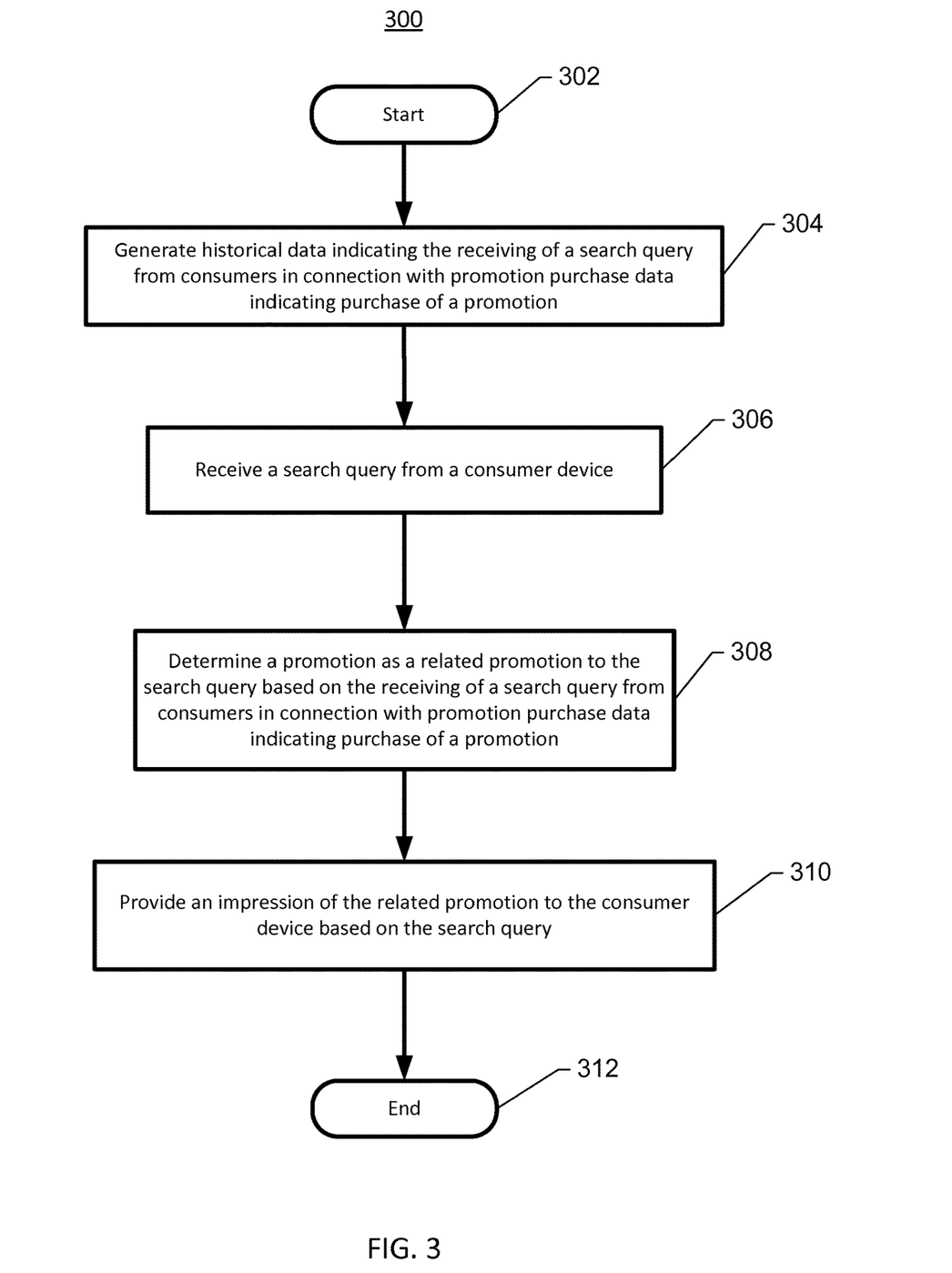
FIG. 3 shows an example of a method for providing a related promotion to a consumer based on a search query performed in accordance with some embodiments.

FIG. 3 shows an example of a method 300 for providing a related promotion to a consumer based on a search query, performed in accordance with some embodiments. Method 300 is described as being performed by system 102 (e.g., server 110), however, other suitably configured structures (e.g., one or more servers, a networked device, hardware, software, firmware, circuitry, etc.) may also be used in various embodiments.

Method 300 may begin at 302 and proceed to 304, where server 110 may be configured to generate historical data indicating the receiving of a search query from consumers in connection with promotion purchase data indicating purchases of a promotion. For example, the historical data may link search terms with promotions that were purchased in connection with the use of the search term by consumers. For example, server 110 may be configured to track and/or associate purchases of promotions for each consumer and search queries provided by each consumer to generate the historical data.

In some embodiments, server 110 may be configured provide one or more impressions of promotions to consumer devices for purchase by consumers. The one or more impressions may be provided to consumer devices via any suitable communications channel, including email, text (e.g., short messaging service (SMS)), a consumer device application, among other things. In some embodiments, the one or more impressions may be provided in response to a receiving a search query from a consumer device. For example, server 110 may be configured to determine one or more matching promotions based on the search query and may then provide the one or more matching promotions (e.g., via the one or more impressions) to the consumer device.

In some embodiments, the one or more matching promotions for the search query may be defined by promotion data, such as promotion data received from merchant device 108 and/or generated by server 110. For example, the promotion data for a promotion may indicate one or more of matching search queries for the promotion. In another example, server 110 may be configured to determine the one or more matching search queries for the promotion based on promotion data received from merchant device 108, such as promotion data indicating the characteristics of the promotion. Server 110 may be further configured to provide the one or more matching promotions to the consumer device based on a search query received from the consumer device.

In some embodiments, server 110 may be configured to provide one or more impressions of one or more promotions to consumer device 106, such as in response to receiving the search query and/or otherwise (e.g., at schedule times). In some embodiments, upon a consumer purchasing and/or accepting the promotion, the consumer may be provided an instrument that may be used (e.g., with the merchant) toward at least a portion of the purchase of particular goods, services and/or experiences defined by the promotion. An "instrument," as used herein, may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/ or a reduction in a purchase price of a particular good, service and/or experience.

In some embodiments, server 110 may be configured to generate the historical data by associating a related promotion with a search query, such as after determining the promotion as the related promotion to the search query based on the receiving of the search query from consumers in connection with the promotion purchase data indicating purchase of the related promotion. For example, server 110 may be configured to store the historical data in database 112 of system 102 and/or access the historical data from database 112.

Figure 4:
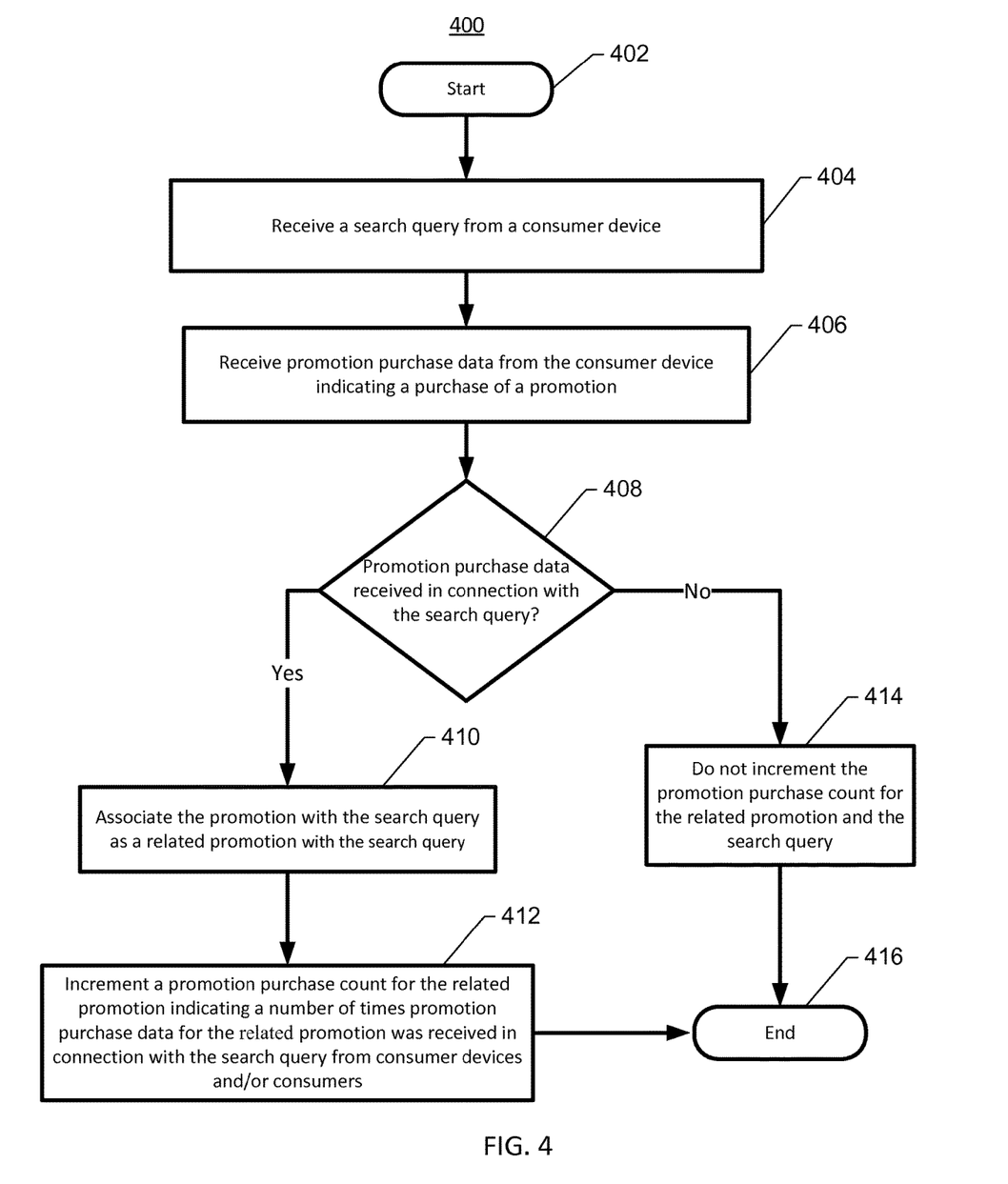
FIG. 4 shows an example of a method for generating historical data performed in accordance with some embodiments.

In some embodiments and as discussed in greater detail with respect to FIG. 4, server 110 may be configured generate the historical data by determining whether the promotion was purchased "in connection" with the search query. For example, the promotion may be determined to be purchased in connection with the search query based on server 118 receiving (e.g., from a consumer device) promotion purchase data indicating purchase of the promotion and the search query within a communication session, within a predetermined time, by the same consumer, and/or the like. Furthermore, server 110 may be configured to associate a promotion with a search query in response to determining that the promotion was purchased in connection with the search query. For example, historical data may be generated by tracking search queries and promotion purchases from multiple (e.g., all) consumers. A promotion purchase count indicating a number of purchases of the promotion by consumers that are associated with on the search query may be incremented based on the association of the search query and promotion. Here, each association of the promotion and the search query, as indicated by the promotion purchase count, may be counted as a "vote" for the search query and the promotion being related.

In some embodiments, the promotion purchase count and/or a promotion purchase score may be determined based on weighted historical data. For example, a search query received within a shorter period of time of the promotion purchase data for a promotion may be associated with a larger weighting value than when the search query is received within a longer period of time of the promotion purchase data. Here, the shorter period of time may indicate a stronger relationship and/or relevance between the search query and the promotion than the longer period of time, and accordingly, may be weighted such that the shorter period of time may be counted as a more important vote for the search query and promotion being related than the longer period of time. Additionally and/or alternatively, an instance of an associated search query and promotion may receive a higher weighting value for a consumer when the search query and promotion purchase data are received within the same communication session than separate communication sessions and/or for communication sessions that are closer in time with each other. As such, in some embodiments, different instances of association between a promotion and a search query may receive different weighting values based on various circumstances that suggest a stronger relationship and/or relevance to between the search query and promotion. In some embodiments, the promotion purchase count and/or a promotion purchase score may be determined based on weighted values for one or more instances of association (e.g., across multiple consumers). In that sense, server 110 may be configured to generate and/or access historical data including weighted historical data.

At 306, server 110 may be configured to receive a search query from a consumer device. For example, the search query may be received from consumer device 106 while a consumer associated with consumer device 106 is searching for one or more promotions for purchase and/or acceptance. In some embodiments, server 110 may be configured to provide a user interface for receiving the search query. For example, the user interface may be configured to receive user inputs indicating the search query from the consumer, such as via a user input device (e.g., touchscreen, keyboard, etc.) of the consumer device. The search query may include one or more words and/or phrases and may provide an indication of consumer intent for a particular promotion and/or type of promotion. Additionally and/or alternatively, the search query may be used in method 300 to provide an indication of consumer interest for one or more related promotions and/or types of related promotions.

At 308, server 110 may be configured to determine a promotion as a related promotion to the search query based on the historical data, such as historical data indicating the receiving of a search query from consumers in connection with promotion purchase data indicating purchase of a promotion. A "related promotion," as used herein, may refer to a promotion that is related to a search query, but is not necessarily a "matching" promotion for the search query (e.g., as defined by the promotion data for the promotion). For example, server 110 may be configured to determine a promotion as a related promotion to a search query based on the historical data, such as historical data indicating that consumers tend to purchase the promotion in connection with providing the search query.

In general, a promotion may be determined to be a related promotion to a search query when the historical data indicates that consumers that provided the search query are also likely to purchase the promotion. For example, the historical data may indicate that consumers that provide a "flowers" search query may be likely to purchase a promotion directed to chocolates, even when the promotion directed to chocolates is not a "matching" promotion for the flowers search query. In that sense, some embodiments may provide for a technique of "crowdsourcing" historical data indicating associations between related promotions and search queries. In some embodiments, server 110 may be configured to use weighted historical data to determine the promotion as the related promotion to the search query.

In some embodiments, server 110 may be configured to determine the promotion as a related promotion to the search query based on the promotion purchase count for the promotion and the search query. For example, server 110 may be configured to determine a promotion purchase count for the search query and a plurality of promotions. The promotion purchase counts may be compared and/or ranked, with one or more of the highest ranking promotions determined to be related promotions.

At 310, server 110 may be configured to provide an impression of the related promotion to the consumer device based on the search query. For example, the impression may be provided by server 110 to consumer device 108 via network 104. In some embodiments, server 110 may be configured to provide a related promotions display including at least the related promotion. For example, the related promotions display may include a listing of one or more related promotions related to the search query. In some embodiments, the related promotions display may include references (e.g., hyperlinks) to the impressions of the one or more related promotions. In addition to references, each related promotion in the related promotions display may include a name, description, price, among other things. In response to receiving an indication of a selection of a reference to a related promotion from the consumer device, the impression of the related promotion may be provided to the consumer device.

In some embodiments, the related promotions display may be part of a promotion search results display provided to the consumer device in response to receiving the search query. For example, the promotion search results display may include references to one or more matching promotions, such as may be determined based on the search query and promotion data associating the search query with the one or more matching promotions. Furthermore, additional information (e.g., name, description, price, among other things) about the matching promotions may also be shown. In some embodiments, the promotion search results display may include a matching promotions display and a related promotions display. For example, the different displays may be located at different regions of the promotion search results display. In response to receiving an indication of a selection of a reference to a related promotion or a matching promotion from the consumer device, an impression of the related promotion or matching promotion may be provided to the consumer device. Method 300 may then end at 312.

FIG. 4 shows an example of a method 400 generating historical data, performed in accordance with some embodiments. Method 400 is described as being performed by system 102 (e.g., server 110), however, other suitably configured structures (e.g., one or more servers, a networked device, hardware, software, firmware, circuitry, etc.) may also be used in various embodiments. In some embodiments, method 400 may be performed with method 300, such as to generate the historical data used to determine the promotion as the related promotion to the search query in method 300.

Method 400 may begin at 402 and proceed to 404, where server 110 may be configured to receive a search query from a consumer device. In some embodiments, the discussions at 304 and 306 of method 300 may be applicable at 404. For example, the search query may be received from a consumer device while a consumer associated with the consumer device is searching for one or more promotions for purchase and/or acceptance. Furthermore, one or more matching promotions and/or one or more related promotions may be determined (e.g., based on existing historical data, which may be updated using method 400) and provided to the consumer device. In that sense, the consumer device discussed in connection with method 400 may be the same as (or different from) the consumer device discussed in method 300.

At 406, server 110 may be configured to receive promotion purchase data from the consumer device indicating purchase of a promotion. For example, the promotion purchase data may be received in response to providing an impression of the promotion to the consumer device. In that sense, the discussion at 310 of method 300 may be applicable at 406. In some embodiments, server 110 may be configured to receive the promotion purchase data from the consumer device indicating purchase of the promotion after 310 of method 300, such as after an impression of the promotion as a related promotion is provided to the consumer device.

In some embodiments, server 110 may be further configured to determine whether the promotion indicated by the promotion purchase data is a matching promotion with the search query. In response to determining that the promotion is not a matching promotion, method 400 may proceed to 408. In response to determining that the promotion is a matching promotion, method 400 may end such that the historical data does not include the matching promotion as a related promotion. Here, matching promotions may be eliminated from the pool of potential candidates for the one or more related promotions of the search query.

At 408, server 110 may be configured to determine whether the promotion purchase data was received in connection with the search query. As discussed below, the promotion purchase data may be determined to be received in connection with the search query based on various criteria and/or combinations thereof. In general, promotion purchase data that is received close in time to a search query may indicate a relationship and/or relevance between the purchase data and the search query.

In some embodiments, server 110 may be configured to determine whether the promotion purchase data was received in connection with the search query based on whether the promotion purchase data and the search query were received within a communication session. The communication session may be a semi-permanent interactive information exchange between the consumer device and server 110, and in some embodiments, may include a start time and an end time. Consumer activity within a communication session may indicate a relevance and/or relationship between search queries and purchased promotions. For example, the promotion purchase data may be determined to be received in connection with the search query when the promotion purchase data and the search query are received within the start time and the end time of the communication session. In another example, the promotion purchase data may be determined to be received in connection with the search query when the promotion purchase data and the search query are received within a predetermined time after the start time of the communication session.

In some embodiments, server 110 may be configured to determine the start time of the communication session with the consumer device, such as based on when a communication request and/or login data is received from the consumer device. For example, the communication session may be established after receiving the login data such as identification data (e.g., username, email, telephone number, etc.) and/or authentication data (e.g., password, electronic token, etc.) for a consumer account from the consumer device and validating the login data. For example, the received login data may be compared with stored login data stored in database 112 and/or other memory.

In some embodiments, server 110 may be further configured to determine the end time of the communication session with the consumer device, such as based on when data indicating consumer logoff, closing of an application and/or browser, a predetermined period of consumer and/or consumer device inactivity, a predetermined period after establishment of the communication session, loss of communication with the consumer device, etc. is received from the consumer device and/or otherwise determined.

In some embodiments, server 110 may be additionally and/or alternatively configured to determine whether the promotion purchase data was received in connection with the search query based on whether the promotion purchase data and the search query was received within a predetermined time. Regardless of communication session, for example, a search query and promotion purchase data received within a predetermined time (e.g., an hour, several hours, a day, a week, etc.) may indicate a relationship and/or relevance between the search query and the promotion purchase data. For example, a consumer may provide a search query for flowers and also purchase a promotion for chocolates in anticipation of an upcoming date. Here, a close proximity in time (e.g., within the predetermined time) for receiving the search query and the purchase may indicate the relationship and/or relevance of the flowers search query and the promotion for chocolates, such as for other consumers (e.g., with upcoming dates).

In response to determining that the promotion purchase data was received in connection with the search query, method 400 may proceed to 410, where server 110 may be configured to associate the promotion with the search query as a related promotion with the search query. For example, the association may be stored as historical data in database 112. In some embodiments, server 110 may be configured to aggregate the historical data for multiple (e.g., all) consumers, such as over a period of time. For example, repeated instances of consumers that search for flowers and also buying the promotion for chocolates, and/or consumers that search for chocolates and also buying a promotion for flowers, may indicate a general tendency for consumers to have an interest in flowers to also have an interest in chocolates.

In some embodiments, server 110 may be configured to generate the related promotion, such as in a first instance of an association between the promotion and the search query across the multiple (e.g., all) consumers. For example, server 110 may be configured to determine whether the promotion has been associated with the search query in the historical data (e.g., as a related promotion), and in response to determining that the promotion has not been associated with the search query, server 110 may be configured to generate and/or update historical data to include the related promotion.

At 412, server 110 may be configured to increment a promotion purchase count for the related promotion indicating a number of times promotion purchase data for the related promotion was received in connection with the search query from consumer devices and/or consumers. In some embodiments, the promotion purchase count may be stored as historical data in association with the related promotion and the search query. In some embodiments, server 110 may be configured to increment the promotion purchase count for the related promotion each time the related promotion and the search query are associated based on consumer activity, such as at 410. If the related promotion has been just generated, such as after the first instance of an association between the promotion and the search query in the historical data, server 110 may be further configured to initiate the promotion purchase count, such as at a value of 1. Method 400 may then proceed to 416 and end.

Returning to 408, in response to determining that the promotion purchase data failed to be received in connection with the search query, method 400 may proceed to 414, where server 110 may be configured to not increment the promotion purchase count for the related promotion and the search query. For example, the promotion purchase data may have been received several weeks after the search query (e.g., not within the same communication session and/or predetermined period of time), at which point likelihood of a relationship or relevance may be decreased. In another example, the search query may have been received several weeks after the promotion purchase data (e.g., not within the same communication session and/or predetermined period of time), at which point the likelihood of a relationship or relevance may be decreased. The promotion purchase count for the related promotion, if the related promotion has been generated and/or otherwise determined, may be not incremented. Furthermore, associating the search query and the promotion as a related promotion may be not performed. Method 400 may then end at 416.

Figure 5:
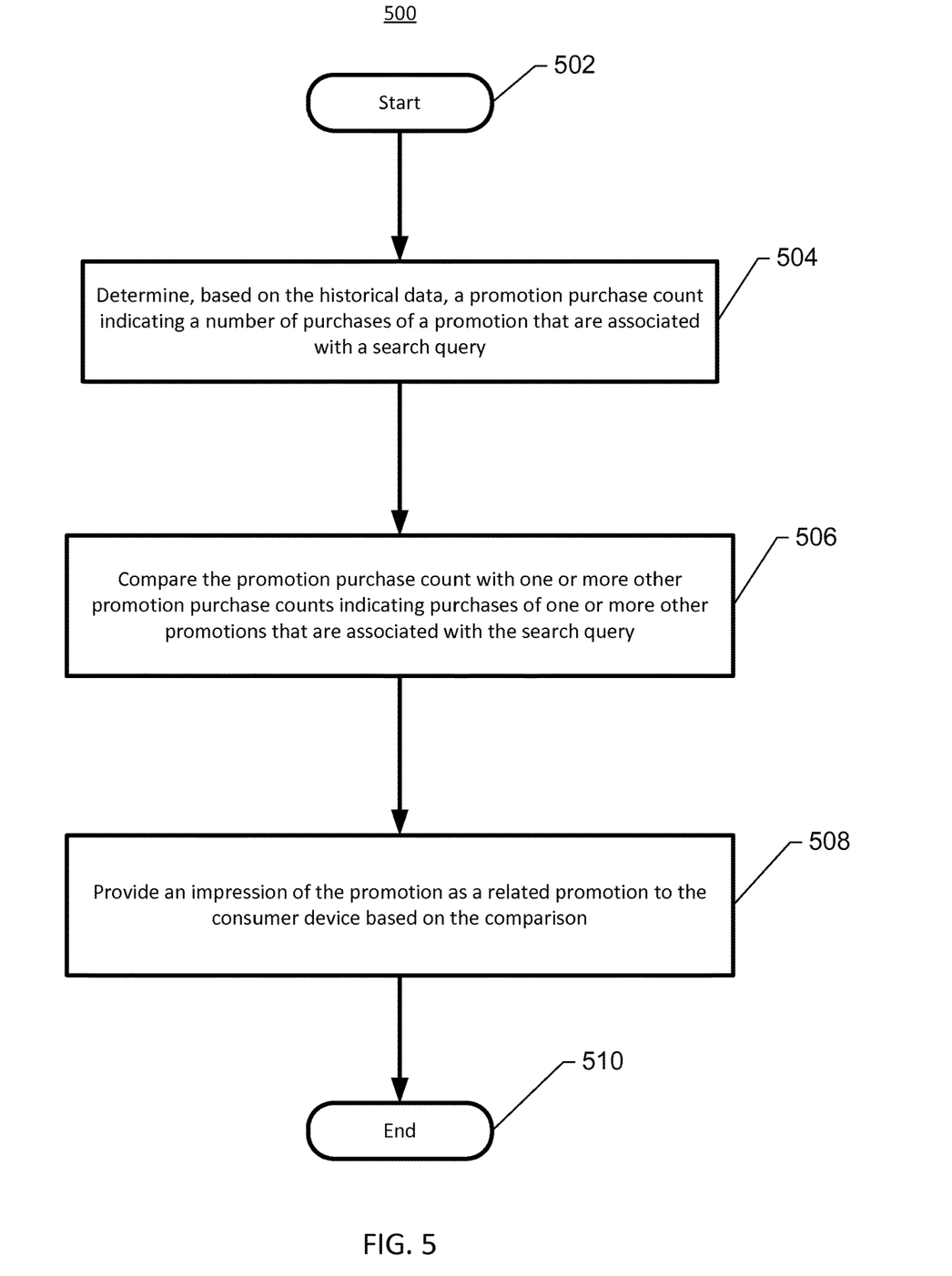
FIG. 5 shows an example of a method for determining a related promotion to a search query based on historical data performed in accordance with some embodiments.

FIG. 5 shows an example of a method 500 for determining a related promotion to a search query based on historical data, performed in accordance with some embodiments. Method 500 is described as being performed by system 102 (e.g., server 110), however, other suitable structures (e.g., one or more servers, a networked device, hardware, software, firmware, circuitry, etc.) may also be used in various embodiments. In some embodiments, method 500 may be performed with method 300 and/or 400, such as at 308 of method 300, after a search query has been received from a consumer device.

Method 500 may begin at 502 and proceed to 504, where server 110 may be configured to determine, based on the historical data, a promotion purchase count indicating a number of purchases of a promotion that are associated with the search query. For example, the promotion purchase count may indicate the number of purchase of the promotion made by consumers in connection with the consumers providing the search term. In some embodiments, server 110 may be configured to determine a promotion purchase count for each promotion that is a related promotion to the search query (e.g., based on the association of the promotion with the search query discussed at 410 of method 400).

In some embodiments, the promotion purchase count may be stored as historical data in database 112. Server 110 may be further configured to access the historical data, such as by sending a request for related promotions and/or their promotion purchase counts based on the search query received from the consumer device.

At 506, server 110 may be configured to compare the promotion purchase count of the related promotion with one or more other promotion purchase counts indicating purchases of one or more other (e.g., related) promotions that are associated with the search query. For example, server 110 may be configured to rank the one or more promotions based on promotion purchase counts.

At 508, server 110 may be configured to provide an impression of the promotion as a related promotion to the search query based on the comparison. For example, the impression may include the top N ranking related promotions based on promotion purchase counts, where N is a positive integer. The discussion at 310 of method 300 may be applicable at 508. Method 500 may then end at 510.

Figure 6:
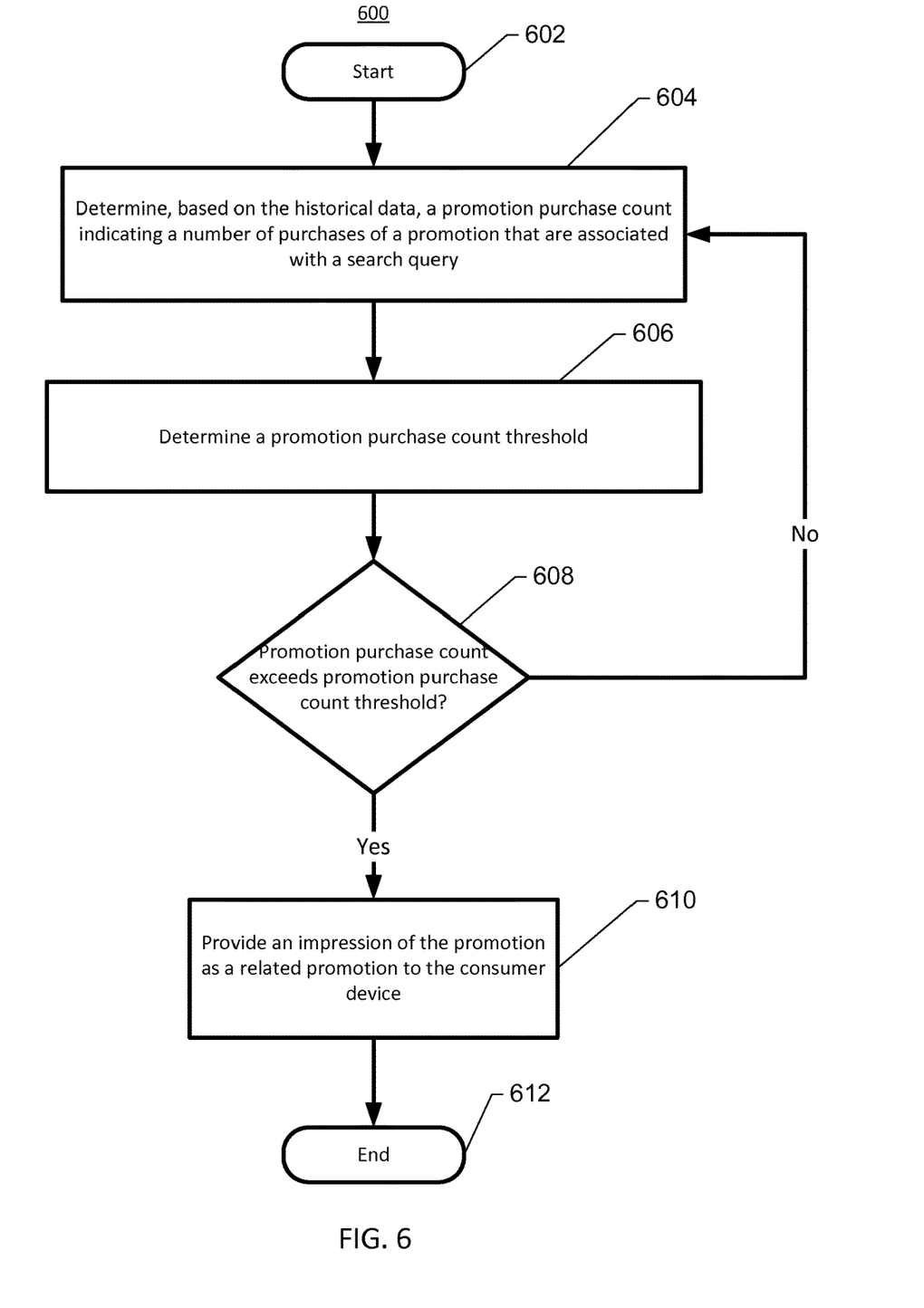
FIG. 6 shows an example of a method for determining a related promotion to a search query based on historical data performed in accordance with some embodiments.

FIG. 6 shows an example of a method 600 for determining a related promotion to a search query based on historical data, performed in accordance with some embodiments. Method 600 is described as being performed by system 102 (e.g., server 110), however, other suitable structures (e.g., one or more servers, a networked device, hardware, software, firmware, circuitry, etc.) may also be used in various embodiments. In some embodiments, method 600 may be performed with method 300 and/or 400, such as at 308 of method 300, after a search query has been received from a consumer device. In some embodiments, method 600 may be performed in alternative or in addition to method 500.

Method 600 may begin at 602 and proceed to 604, where server 110 may be configured to determine, based on the historical data, a promotion purchase count indicating a number of purchases of a promotion that are associated with a search query. The discussion at 504 of method 500 may be applicable at 604, and is not repeated to avoid unnecessarily overcomplicating the disclosure.

At 606, server 110 may be configured to determine a promotion purchase count threshold. In some embodiments, the promotion purchase count threshold may indicate a threshold number of purchases of the promotion that are associated with search query before the promotion is provided to the consumer device as a related promotion to the search query. For example, a promotion purchase count threshold of 10 may indicate that ten purchases of the promotion in connection with the search query are needed (e.g., as indicated by the historical data) before the promotion is provided to the consumer device as a related promotion to the search query.

At 608, server 110 may be configured to determine whether the promotion purchase count exceeds the promotion purchase count threshold. As discussed at 412 of method 400, the promotion purchase count may be incremented for a related promotion when a consumer purchases the related promotion in connection with providing the search query. As such, the promotion purchase count may indicate a number of "votes" for the promotion and the search query being related.

In response to determining that the promotion purchase count fails to exceed the promotion purchase count threshold, method 600 may return to 604, where server 110 may be configured to update and/or otherwise monitor the historical data. For example, the promotion purchase count may be incremented based on consumer activity, as discussed at 412 of method 400.

In response to determining that the promotion purchase count exceeds the promotion purchase count threshold, method 600 may proceed to 610, where server 110 may be configured to provide an impression of the promotion as a related promotion to the consumer device. The discussion at 310 of method 300 may be applicable at 610.

In some embodiments, server 110 may be configured to perform method 600 for each of one or more promotions associated with the search query as related promotions. For example, server 110 may determine whether a promotion purchase count for each promotion exceeds the promotion purchase count threshold. Server 110 may be further configured to provide one or more impressions including one or more promotions having a promotion purchase count that exceeds the promotion purchase count threshold. Additionally or alternatively, server 110 may be further configured to rank the one or more promotions (e.g., based on promotion purchase counts) and/or provide the one or more impressions of the top M ranking promotions to the consumer device, where M is a positive integer. Method 600 may then proceed to 612 and end.

CONCLUSION

Many modifications and other embodiments will come to mind to one skilled in the art to which these embodiments pertain having the benefit of the teachings presented in the foregoing descriptions and the associated drawings. For example, the techniques discussed herein involving determining related promotions to search queries may easily be extended to other contexts where goods, services, and/or experiences related to a search query may be offered to consumers. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

That which is claimed:

1. A system configured to provide related promotions to consumers, comprising:
   one or more servers including:
   communications circuitry configured to connect with consumer devices via a network; and
   promotion search circuitry configured to:
   generate historical data including one or more historical data records, wherein each historical data record of the one or more historical data records indicates a latency time interval between a query receipt time for a respective query of one or more queries and a promotion purchase time for a respective promotion record of one or more promotion records, and wherein each promotion record is associated with a predefined number of available impressions;
   receive, via the network, a search query of the one or more search queries from a first consumer device;
   determine, based at least in part on one or more first historical data records associated with the search query and a promotion record of the one or more promotion records that is associated with the search query, a promotion purchase count for the search query and the promotion record indicating a number of the one or more first historical data records adjusted by each latency time interval associated with the one or more first historical data records, wherein the promotion purchase count comprises a number of purchases associated with the promotion record by a plurality of consumers associated with the search query;
   determine the promotion record as a related promotion record to the search query by:
   determining a promotion purchase count threshold,
   determining whether the promotion purchase count exceeds the promotion purchase count threshold, and
   in response to determining that the promotion purchase count exceeds the promotion purchase count threshold, determine the promotion record as the related promotion record to the search query;
   generate an impression comprising an electronic user interface, the impression indicating the related promotion;
   provide the impression of the related promotion record to the first consumer device via the network in response to receiving the search query from the first consumer device;
   access promotion data from a computer readable media;
   determine, based on the promotion data, a second promotion as a matching promotion to the search query based on a comparison of one or more shared characteristics associated with the first promotion and the second promotion;
   generate a second impression comprising the electronic user interface indicating the second promotion; and
   provide the second impression of the second promotion to the first consumer device.

2. The system of claim 1, wherein the promotion search circuitry configured to generate the historical data indicating the associations between search queries and promotion records includes the promotion search circuitry configured to:
- establish a communication session with a second consumer device
- receive the search query from the second consumer device;
- receive promotion purchase data from the second consumer device indicating a purchase of the promotion record;
- determine whether the promotion purchase data was received in connection with the search query by determining whether the promotion purchase data and the search query were received within the communication session; and
- in response to determining that the promotion purchase data and the search query were received within the communication session, associate the promotion record with the search query.

3. The system of claim 1, wherein the promotion search circuitry configured to generate the historical data includes the promotion search circuitry configured to:
- receive the search query from a second consumer device;
- receive promotion purchase data from the second consumer device indicating a purchase of the promotion; and
- determine whether the promotion purchase data was received in connection with the search query; and
- in response to determining that the promotion purchase data was received in connection with the search query, increment a promotion purchase count for the related promotion record indicating a number of times promotion purchase data for the related promotion was received in connection with the search query from consumers.

4. The system of claim 3, wherein the promotion search circuitry is further configured to:
- establish a communication session with the second consumer device; and
- determine whether the promotion purchase data was received in connection with the search query by determining whether the promotion purchase data and the search query were received within the communication session.

5. The system of claim 3, wherein the promotion search circuitry is configured to determine whether the promotion purchase data was received in connection with the search query by determining whether the promotion purchase data and the search query was received within the latency time interval.

6. The system of claim 1, wherein the promotion search circuitry is further configured to:
- determine whether the related promotion was purchased by a first consumer account associated with the first consumer device after providing the impression of the related promotion to the first consumer device; and
- in response to determining that the related promotion was purchased by the first consumer account, increment a promotion purchase count for the related promotion indicating a number of times promotion purchase data for the promotion was received in connection with the search query from consumers.

7. A machine-implemented method for providing related promotions to consumers, comprising:
- generating, by a processor, historical data including one or more historical data records, wherein each historical data record of the one or more historical data records indicates a latency time interval between a query receipt time for a respective query of one or more queries and a promotion purchase time for a respective promotion record of one or more promotion records, and wherein each promotion record is associated with a predefined number of available impressions;
- receiving, by the processor, a search query of the one or more search queries from a first consumer device via the network;
- determine, by the processor and based at least in part on one or more first historical data records associated with the search query and a promotion record of the one or more promotion records that is associated with the search query, a promotion purchase count for the search query and the promotion record indicating a number of the one or more first historical data records adjusted by each latency time interval associated with the one or more first historical data records, wherein the promotion purchase count comprises a number of purchases associated with the promotion record by a plurality of consumers associated with the search query;
- determining, by the processor, the promotion record as a related promotion record to the search query by:
  - determining a promotion purchase count threshold,
  - determining whether the promotion purchase count exceeds the promotion purchase count threshold, and
  - in response to determining that the promotion purchase count exceeds the promotion purchase count threshold, determine the promotion record as the related promotion record to the search query;
- generating, by the processor, an impression comprising an electronic user interface, the impression indicating the related promotion record;
- providing, by the processor, the impression of the related promotion record to the first consumer device via the network in response to receiving the search query from
- accessing, by the processor, promotion data from a computer readable media;
- determining, by the processor, based on the promotion data, a second promotion as a matching promotion to the search query based on a comparison of one or more shared characteristics associated with the first promotion and the second promotion;
- generating, by the processor, a second impression comprising the electronic user interface indicating the second promotion; and
- providing, by the processor, the second impression of the second promotion to the first consumer device.

8. The method of claim 7, wherein generating the historical data indicating the associations between search queries and promotion records includes:
- establishing a communication session with a second consumer device;
- receiving the search query from the second consumer device;
- receiving promotion purchase data from the second consumer device indicating a purchase of the promotion record;
- determining whether the promotion purchase data was received in connection with the search query by determining whether the promotion purchase data and the search query were received within the communication session; and
- in response to determining that the promotion purchase data and the search query were received within the communication session, associating the promotion record with the search query.

9. The method of claim 8, wherein generating the historical data indicating the receiving of the search query from consumers in connection with the promotion purchase data includes:
  receiving the search query from a second consumer device;
  receiving promotion purchase data from the second consumer device indicating a purchase of the promotion; and
  determining whether the promotion purchase data was received in connection with the search query; and
  in response to determining that the promotion purchase data was received in connection with the search query, incrementing a promotion purchase count for the related promotion indicating a number of times promotion purchase data for the related promotion record was received in connection with the search query from consumers.

10. The method of claim 9 further comprising, by the processor:
  establishing a communication session with the second consumer device; and
  determining whether the promotion purchase data was received in connection with the search query by determining whether the promotion purchase data and the search query were received within the communication session.

11. The method of claim 9, wherein determining whether the promotion purchase data was received in connection with the search query includes determining whether the promotion purchase data and the search query was received within the latency time interval.

12. The method of claim 7 further comprising, by the processor:
  determining whether the related promotion was purchased by a first consumer account associated with the first consumer device after providing the impression of the related promotion to the first consumer device; and
  in response to determining that the related promotion was purchased by the first consumer account, incrementing a promotion purchase count for the related promotion indicating a number of times promotion purchase data for the promotion was received in connection with the search query from consumers.

13. A networked apparatus configured to provide related promotions to consumers, comprising:
  processing circuitry configured to:
  generate historical data including one or more historical data records, wherein each historical data record of the one or more historical data records indicates a latency time interval between a query receipt time for a respective query of one or more queries and a promotion purchase time for a respective promotion record of one or more promotion records, and wherein each promotion record is associated with a predefined number of available impressions;
  receive, via a network, a search query of the one or more search from a first consumer device;
  determine, based at least in part on one or more first historical data records associated with the search query and a promotion record of the one or more promotion records that is associated with the search query, a promotion purchase for the search query and the promotion record indicating a number of the one or more first historical data records adjusted by each latency time interval associated with the one or more first historical data records, wherein the promotion purchase count comprises a number of purchases associated with the promotion record by a plurality of consumers associated with the search query;
  determine a promotion purchase count threshold;
  determine whether the promotion purchase count exceeds the promotion purchase count threshold;
  in response to determining that the promotion purchase count exceeds the promotion purchase count threshold, determine the promotion record as a related promotion record to the search query;
  generate an impression comprising an electronic user interface, the impression indicating the related promotion record;
  provide the impression of the related promotion record to the first consumer device via the network in response to receiving the search query from the first consumer device;
  access promotion data from a computer readable media;
  determine, based on the promotion data, a second promotion as a matching promotion to the search query based on a comparison of one or more shared characteristics associated with the first promotion and the second promotion;
  generate a second impression comprising the electronic user interface indicating the second promotion; and
  provide the second impression of the second promotion to the first consumer device.

14. The apparatus of claim 13, wherein the processing circuitry is further configured to generate historical data indicating the associations between search queries and promotion records based on the processing circuitry being configured to:
  establish a communication session with a second consumer device;
  receive the search query from the second consumer device;
  receive promotion purchase data from the second consumer device indicating a purchase of the promotion record;
  determine whether the promotion purchase data was received in connection with the search query by determining whether the promotion purchase data and the search query were received within the communication session; and
  in response to determining that the promotion purchase data and the search query were received within the communication session, associate the promotion record with the search query.

15. The apparatus of claim 14, wherein the processing circuitry configured to generate the historical data includes the processing circuitry being configured to:
  receive the search query from a second consumer device;
  receive promotion purchase data from the second consumer device indicating a purchase of the promotion; and
  determine whether the promotion purchase data was received in connection with the search query; and
  in response to determining that the promotion purchase data was received in connection with the search query, increment a promotion purchase count for the related promotion indicating a number of times promotion purchase data for the related promotion was received in connection with the search query from consumers.

16. The apparatus of claim 14, wherein the processing circuitry configured to determine whether the promotion purchase data was received in connection with the search query includes the processing circuitry being configured to determine whether the promotion purchase data and the search query was received within the latency time interval.

\* \* \* \* \*